United States Patent
Inoue et al.

(10) Patent No.: US 8,444,208 B2
(45) Date of Patent: May 21, 2013

(54) STRUCTURE FOR ATTACHING MOUNTING MEMBER TO DOOR IMPACT BEAM

(75) Inventors: Norihito Inoue, Aichi (JP); Nobuo Hayama, Aichi (JP)

(73) Assignee: Toyota Shatai Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/395,100

(22) PCT Filed: Sep. 17, 2009

(86) PCT No.: PCT/JP2009/066238
§ 371 (c)(1),
(2), (4) Date: Mar. 8, 2012

(87) PCT Pub. No.: WO2011/033634
PCT Pub. Date: Mar. 24, 2011

(65) Prior Publication Data
US 2012/0163906 A1 Jun. 28, 2012

(51) Int. Cl.
*B60J 5/00* (2006.01)
(52) U.S. Cl.
USPC .................................................. 296/146.6

(58) Field of Classification Search
USPC .......................................... 296/146.6
See application file for complete search history.

(56) References Cited

U.S. PATENT DOCUMENTS
7,041,193 B2 * 5/2006 Bogert et al. ............... 156/307.3

FOREIGN PATENT DOCUMENTS
JP        3-54476        5/1991
JP        2007-118693    5/2007

* cited by examiner

*Primary Examiner* — Dennis Pedder
(74) *Attorney, Agent, or Firm* — Douglas J. Christensen

(57) ABSTRACT

An attachment member has a first holding member and a second holding member that are oppositely positioned on a door impact beam while holding the door impact beam therebetween. The first holding member has a claw portion formed therein. The claw portion is capable of being elastically deformed by contacting the door impact beam when the attachment member is attached to the door impact beam. At least one of the first holding member and the second holding member is adhered to the door impact beam. The first holding member and the second holding member are bonded while being electrically connected to each other. The attachment member is attached to the door impact beam while the claw portion contacts the door impact beam.

3 Claims, 5 Drawing Sheets

STRUCTURE FOR ATTACHING MOUNTING MEMBER TO DOOR IMPACT BEAM

PRIORITY CLAIM

The present application is a National Phase entry of PCT Application No. PCT/JP2009/066238,, filed Sep. 17, 2009, the disclosure of which is hereby incorporated by reference herein in its entirety.

TECHNICAL FIELD

The present invention relates to an attaching structure of an attachment member in a door impact beam.

BACKGROUND ART

Conventionally, a door of a vehicle is provided with a door impact beam that is capable of reinforcing the door against a side-impact. The door impact beam is disposed in the door to extend along a longitudinal direction of the vehicle. A longitudinally intermediate position of the door impact beam may be provided with attachment members that can be used for many different purposes. For example, Japanese Laid-Open Patent Publication No. 2007-118693 discloses a door impact beam provided with a bracket to which a shock-absorbing material is attached. When the bracket is attached to the door impact beam by welding, the door impact beam can be changed in property in a heat-affected portion. As a result, there is concern that performance retention of the door impact beam may become difficult. Therefore, in Japanese Laid-Open Patent Publication No. 2007-118693,, a structure in which the bracket can be attached to the door impact beam without using welding is proposed. In the structure, the bracket is constructed of an outer body and an inner body. The outer body and the inner body are positioned on the door impact beam while holding the door impact beam therebetween, and are connected to each other, so as to be attached to the door impact beam. According to the structure, because the bracket is not directly connected to the door impact beam, the door impact beam cannot be affected in property.

Further, electrodeposition coating is widely used as an anticorrosive coating method of a vehicle body. In this method, electricity is provided to the vehicle body immersed in a solution of a coating material, so as to deposit the coating material on a surface of the vehicle body. Thereafter, the vehicle body is baked to form a coating film thereon. Therefore, when the electrodeposition coating is performed while an attachment member is attached to the door impact beam, in order to form the coating film on the attachment member, the attachment member must be attached to the door impact beam while being electrically connected thereto. However, in the conventional structure, it is not intended to attach the attachment member to the door impact beam while the attachment member is electrically connected to the door impact beam. Thus, there is still room for improvement.

SUMMARY OF THE INVENTION

The present invention provides an attaching structure of an attachment member in a door impact beam of a vehicle, in which the attachment member is attached to a longitudinal intermediate position of the door impact beam while being electrically connected to the door impact beam. The attachment member has a first holding member and a second holding member that are oppositely positioned on the door impact beam while holding the door impact beam therebetween. The first holding member has a claw portion formed therein. The claw portion is capable of being elastically deformed by contacting the door impact beam when the attachment member is attached to the door impact beam. At least one of the first holding member and the second holding member is adhered to the door impact beam. The first holding member and the second holding member are bonded while being electrically connected to each other. The attachment member is attached to the door impact beam while the claw portion contacts the door impact beam.

In one embodiment, a contact portion of the claw portion to the door impact beam may preferably be spherically shaped.

The second holding member may preferably be adhered to the door impact beam via a structural adhesive. Further, a foamed sealer may preferably be filled between the first holding member and the door impact beam.

According to the present invention, the attachment member is adhered to the door impact beam. Therefore, the attachment member can be secured to the door impact beam without affecting property of the door impact beam. Further, the claw portion of the attachment member is maintained in a condition in which it contacts the door impact beam by an elasticity thereof. Therefore, the attachment member can be maintained in a condition in which it is reliably electrically connected to the door impact beam.

When the spherically-shaped contact portion of the claw portion contacts the door impact beam, production of noise can be minimized even if friction is generated between the claw portion and the door impact beam caused by, for example, vibration of the vehicle.

When the second holding member is adhered to the door impact beam via the structural adhesive while the foamed sealer is filled between the first holding member and the door impact beam, the attachment member can be further reliably secured to the door impact beam.

DETAILED DESCRIPTION OF THE INVENTION

Figure 1:
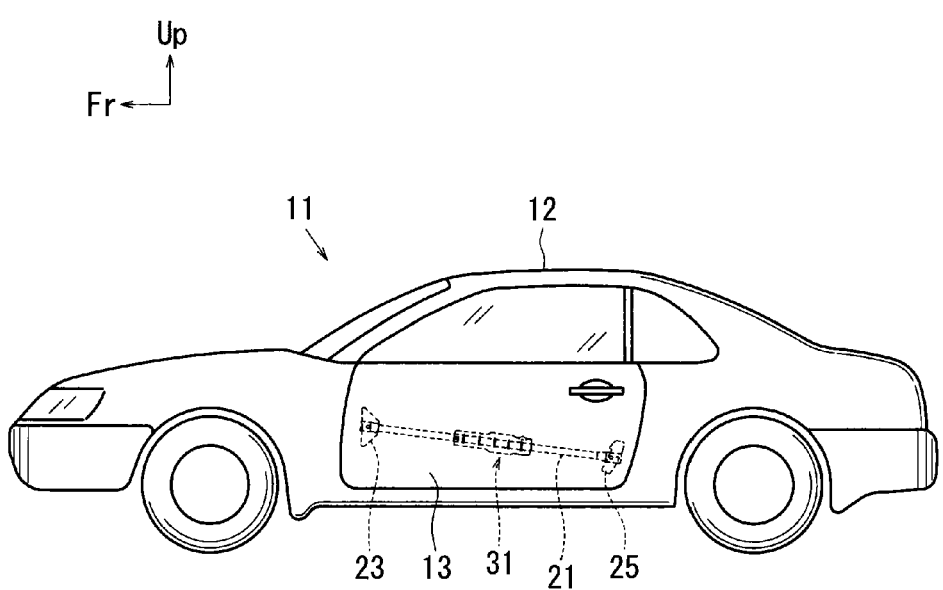
FIG. 1 is a side view of a vehicle according to an embodiment of the present invention.

In the following, an embodiment of the present invention will be described with reference to the drawings. Further, Fr and Up shown by arrows in the drawings means forward and upward of a vehicle. Conversely, OUT and IN shown by arrows in the drawings means a vehicle exterior and a vehicle interior.

Figure 2:
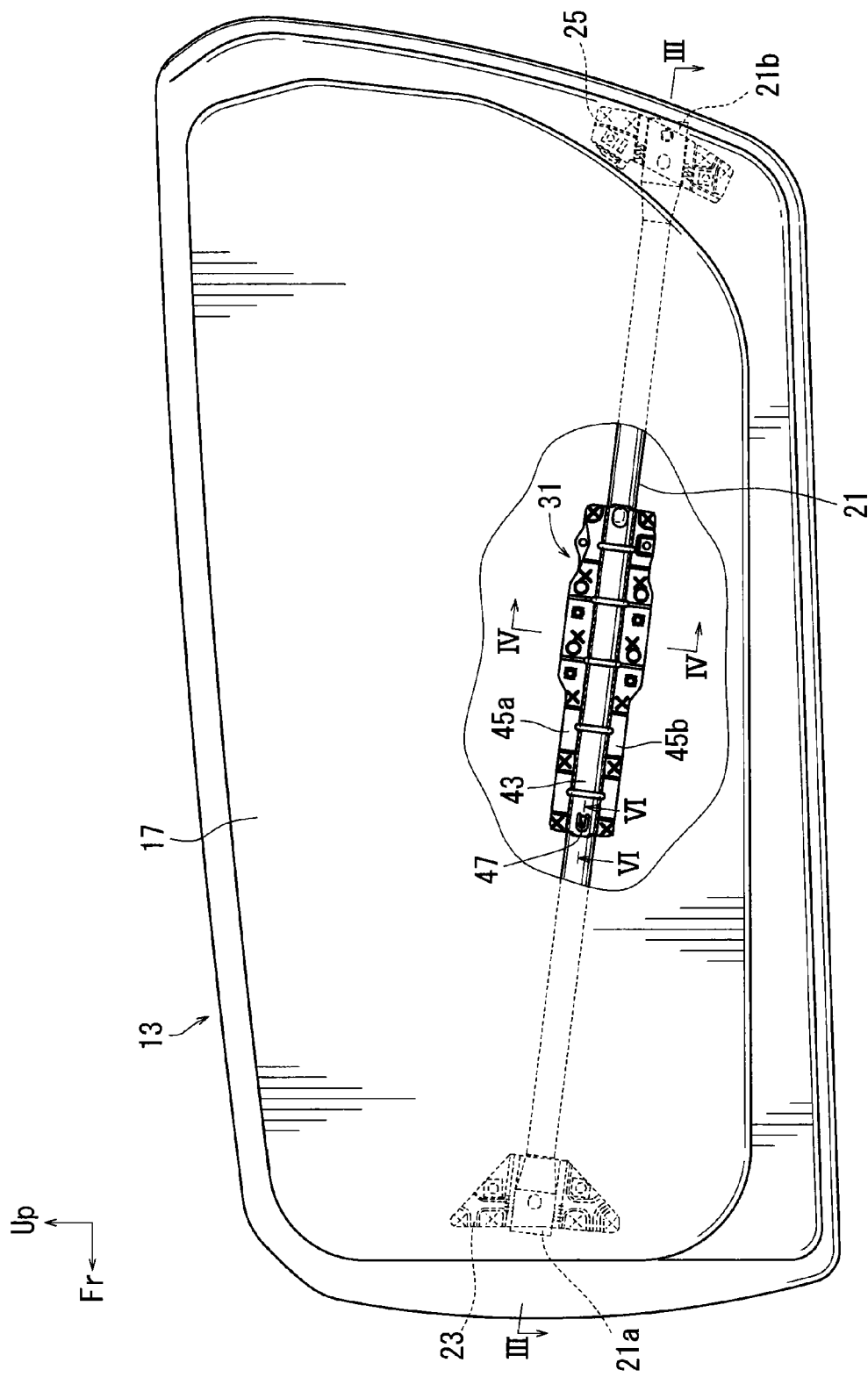
FIG. 2 is a partially cutaway view a side door according to the embodiment of the present invention, which view is viewed from a vehicle interior.
Figure 3:
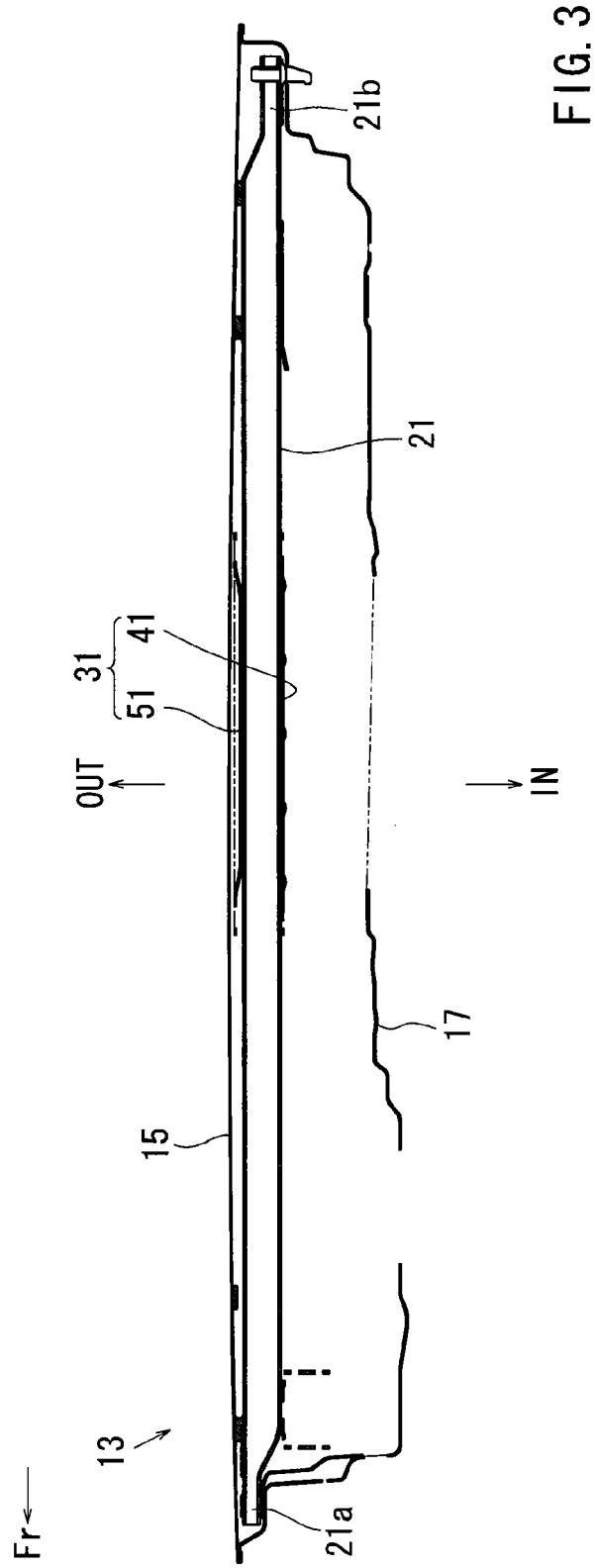
FIG. 3 is a sectional view taken along line III-III of the side door shown in FIG. 2.

A door impact beam 21 of the present embodiment is formed by a steel pipe. As shown in FIG. 1, the door impact beam 21 is disposed in a side door 13 provided to a side portion of a vehicle body 12 of an automobile 11, so as to extend along a longitudinal direction of the vehicle. Thus, the door impact beam 21 is capable of reinforcing the side door 13 against a side-impact. As shown in FIG. 3, the side door 13 includes an outer panel 15 and an inner panel 17. A space is formed between the outer panel 15 and the inner panel 17. An end periphery of the inner panel 17 is bent in a shouldered fashion and is connected to an end periphery of the outer panel 15 by hemming. The door impact beam 21 is positioned between the outer panel 15 and the inner panel 17, and as shown in FIG. 2, both of longitudinal terminal ends 21a, and 21b, of the door impact beam 21 are connected to the inner panel 17 via brackets 23 and 25 made of steel. The terminal ends 21a, and 21b, of the door impact beam 21 are pressed and flattened. The terminal ends 21a, and 21b, of the door impact beam 21 are bonded to the brackets 23 and 25 by arc welding, and the brackets 23 and 25 are secured to the inner panel 17 by spot welding. Thus, the door impact beam 21 is attached to the side door 13 (the inner panel 17) while being electrically connected thereto. Therefore, when electrodeposition coating is applied to the vehicle body 12, electricity can be provided to the door impact beam 21 via the side door 13, so that a coating film can be formed in a surface thereof.

An attachment member 31 is attached to a longitudinal intermediate position of the door impact beam 21. The attachment member 31 is attached to the door impact beam 21 in order to reinforce the door impact beam 21 and to prevent the door impact beam 21 from being bent into the vehicle interior when the door impact beam 21 is applied with an impact in a lateral direction of the vehicle. The attachment member 31 is attached to the door impact beam 21 before the electrodeposition coating of an anticorrosive coating material is applied to the vehicle body 12 having the side door 13.

Figure 4:
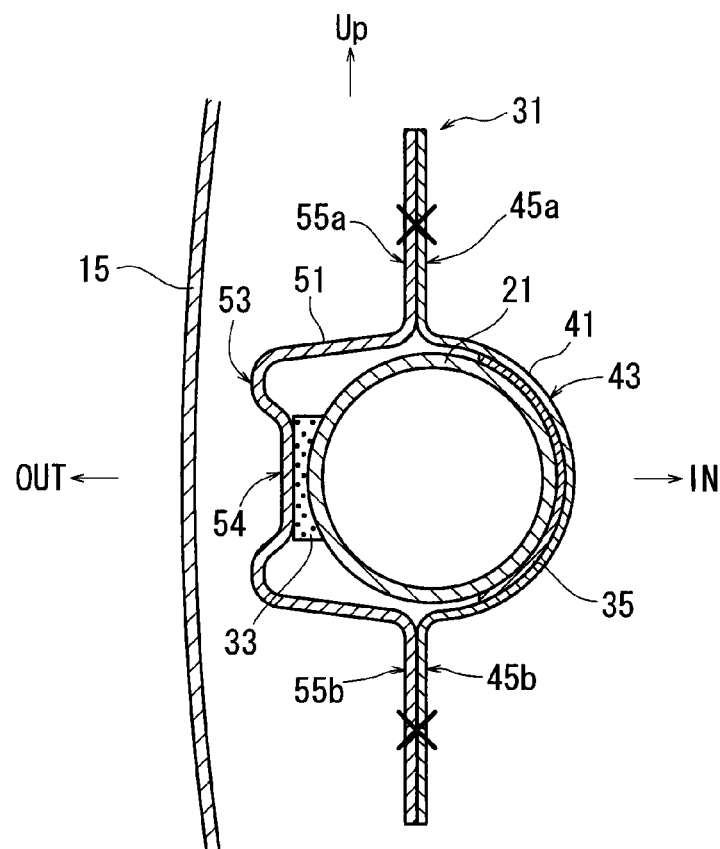
FIG. 4 is a sectional view taken along line IV-IV of the side door shown in FIG. 2.

As shown in FIG. 4, the attachment member 31 has a first holding member 41 and a second holding member 51 that are oppositely positioned on the door impact beam 21 while holding the door impact beam 21 therebetween. Each of the first holding member 41 and the second holding member 51 is formed by press forming a steel plate. The first holding member 41 and the second holding member 51 respectively have main portions 43 and 53 and bonding portions 45a,, 45b,, 55a, and 55b. The main portions 43 and 53 are oppositely positioned on the door impact beam 21 while holding the door impact beam 21 therebetween. The bonding portions 45a,, 45b,, 55a, and 55b, are projected from the main portions 43 and 53 in a flange-shaped fashion and are bonded to each other. The main portion 43 of the first holding member 41 has a groove shape having a semicircular shape in cross section and is capable of receiving substantially half a circumference of the impact beam 21. The main portion 53 of the second holding member 51 has a groove shape having a rectangular shape in cross section and is capable of receiving substantially half the circumference of the impact beam 21. In the attachment member 31 of the present embodiment, the second holding member 51 is relatively thicker than the first holding member 41 and has high rigidity. The second holding member 51 is positioned to face the outer panel 15 and is capable of mainly contributing to reinforcement of the door impact beam 21. The main portion 53 of the second holding member 51 has a depressed portion 54 that is formed in a surface facing the outer panel 15. The depressed portion 54 is formed in a vertically central portion of the second holding member 51, so as to continuously extend in a longitudinal direction of the door impact beam 21. Due to the depressed portion 54, rigidity of the second holding member 51 against a force exerted from the vehicle exterior to the vehicle interior can be further increased.

The bonding portions 45a, and 45b, of the first holding member 41 and the bonding portions 55a, and 55b, of the second holding member 51 are bonded while being electrically connected to each other. In the present embodiment, the bonding portions 45a, and 45b, and the bonding portions 55a, and 55b, are mated with each other and are bonded to each other by spot welding. However, the bonding method is not limited to the spot welding. Other bonding method may include a fastening device such as a screw. In such a case, the first holding member 41 and 45 can be fastened via the fastening device while contacting each other, so as to be electrically connected to each other. Conversely, the first holding member 41 and the second holding member 51 can be fastened via the fastening device, so as to be electrically connected to each other via the fastening device.

The main portion 53 of the second holding member 51 is adhered to the door impact beam 21 via a structural adhesive 33, so that the attachment member 31 is secured to the door impact beam 21. The structural adhesive 33 is disposed between the depressed portion 54 of the main portion 53 of the second holding member 51 and the door impact beam 21, so as to adhere the second holding member 51 and the door impact beam 21. The depressed portion 54 is positioned nearer the door impact beam 21 than the other portion of the main portion 53. The structural adhesive 33 is a thermosetting adhesive having an adhesive force that is capable of at least preventing the attachment member 31 from being displaced before the electrodeposition coating is performed. The structural adhesive 33 can be set when heated in a step in which the vehicle body is baked during the electrodeposition coating, so as to provide a stronger adhesive force.

A foamed sealer 35 is filled between the main portion 43 of the first holding member 41 and the door impact beam 21. The foamed sealer 35 is heated and formed in the step in which the vehicle body is baked during the electrodeposition coating, so as to close a space between the main portion 43 of the first holding member 41 and the door impact beam 21. Thus, because the foamed sealer 35 is used in addition to the structural adhesive 33, the attachment member 31 can be further prevented from being displaced with respect to the door impact beam 21, so as to be further reliably secured thereto.

Figure 5:
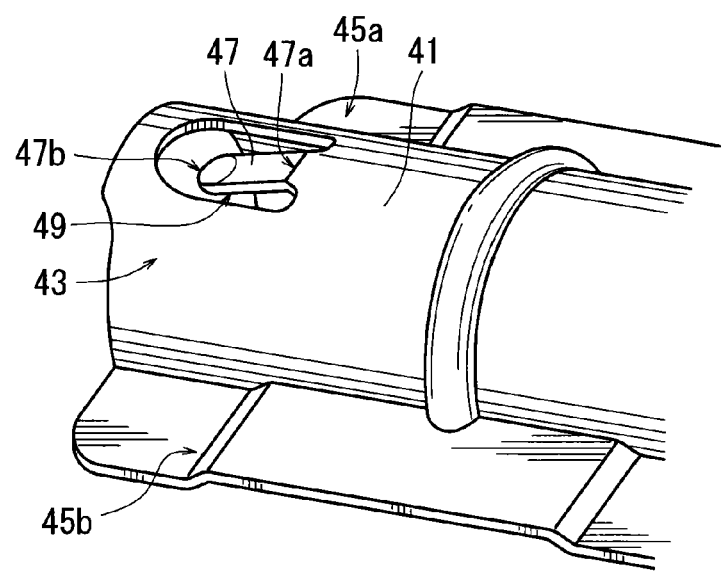
FIG. 5 is an enlarged perspective view a craw portion of a first holding member according to the embodiment of the present invention.
Figure 6:
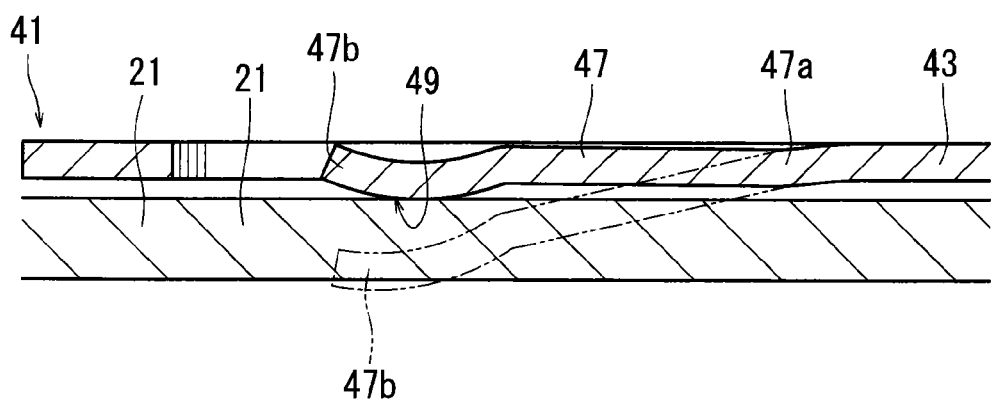
FIG. 6 is a sectional view taken along line VI-VI of the first holding member shown in FIG. 2.

The main portion 43 of the first holding member 41 has at least one claw portion 47 formed therein. In the first holding member 41, a claw portion 47 is formed in one end portion of the main portion 43 in a longitudinal direction thereof. The claw portion 47 is positioned so as to not interfere with the foamed sealer 35. As shown in FIG. 5, the claw portion 47 is formed by stamping out a portion of the main portion 43. A proximal end 47a, of the claw portion 47 is continuous with the main portion 43. Conversely, as shown by chain double-dashed line in FIG. 6, a distal end 47b, of the claw portion 47 is formed as a free end that is projected in a direction to contact the door impact beam 21. As shown by solid line in FIG. 6, when the attachment member 31 is attached to the door impact beam 21, the claw portion 47 contacts the door impact beam 21, so as to be flexed by elastic deformation. Thus, the claw portion 47 can be maintained in a condition in which it is pressed to the door impact beam 21 by an elastic force thereof. The claw portion 47 has a contact portion 49 contacting the door impact beam 21. The contact portion 49 is formed as a spherical surface.

According to the attachment member 31 thus constructed, when the attachment member 31 is attached to the door impact beam 21, the condition in which the claw portion 47 contacts the door impact beam 21 can be maintained. As a result, a condition in which the door impact beam 21 and the attachment member 31 are electrically connected to each other can be maintained. Therefore, when the electrodeposition coating of the anticorrosive coating material is applied to the vehicle body 12, electricity can be provided to the attachment member 31 via the door impact beam 21, so that an anticorrosive coating can be applied to the attachment member 31. Further, the claw portion 47 still contacts the door impact beam 21 after application of the electrodeposition coating. However, because the contact portion 49 is the spherical surface having a small contact area, production of noise caused by friction between the claw portion 47 and the door impact beam 21 can be reduced.

Further, the present invention is not limited to the embodiment described above and can be modified without departing from the scope of the present invention.

The attachment member 31 is not limited to a member that is attached to the door impact beam 21 in order to reinforce the same. For example, the attachment member 31 may be a bracket that is used to attach an impact absorption pad to the door impact beam 21, a bracket that is used to reduce a distance between the outer panel 15 and the door impact beam 21, so as to dispose a mastic therein, or other such members. In the attachment member 31 of the embodiment described above, the main portion 53 of the second holding member 51 functions as a portion of the structure to attach the attachment member 31 to the door impact beam 21 while functioning as a portion mainly having reinforcement function. However, the present invention can be applied to an attachment member in which a portion having intended function is formed as a portion that is different from the structure (the main portions 43 and 53 and the bonding portions 45a,, 45b,, 55a, and 55b) to attach the attachment member to the door impact beam 21.

The invention claimed is:

1. An attaching structure of an attachment member in a door impact beam of a vehicle, in which the attachment member is attached to a longitudinal intermediate position of the door impact beam while being electrically connected to the door impact beam, wherein the attachment member has a first holding member and a second holding member that are oppositely positioned on the door impact beam while holding the door impact beam therebetween, wherein the first holding member has a claw portion formed therein, further wherein the claw portion is capable of being elastically deformed by contacting the door impact beam when the attachment member is attached to the door impact beam, wherein at least one of the first holding member and the second holding member is adhered to the door impact beam, further wherein the first holding member and the second holding member are bonded while being electrically connected to each other, and wherein the attachment member is attached to the door impact beam while the claw portion contacts the door impact beam.

2. The attaching structure of an attachment member in a door impact beam of a vehicle as defined in claim 1, wherein a contact portion of the claw portion to the door impact beam is spherically shaped.

3. The attaching structure of an attachment member in a door impact beam of a vehicle as defined in claim 1, wherein the second holding member is adhered to the door impact beam via a structural adhesive, and wherein a foamed sealer is filled between the first holding member and the door impact beam.

* * * * *